June 1, 1954 G. E. MOHNKERN 2,679,755
TORQUE INDICATOR
Filed May 15, 1952 2 Sheets-Sheet 1

*Inventor:*
GERALD E. MOHNKERN,
by: Donald G. Dalton
his Attorney.

June 1, 1954
G. E. MOHNKERN
2,679,755
TORQUE INDICATOR
Filed May 15, 1952
2 Sheets-Sheet 2
FIG. 7.
FIG. 6.
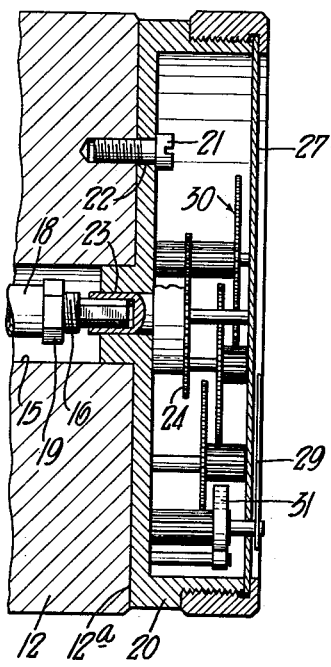
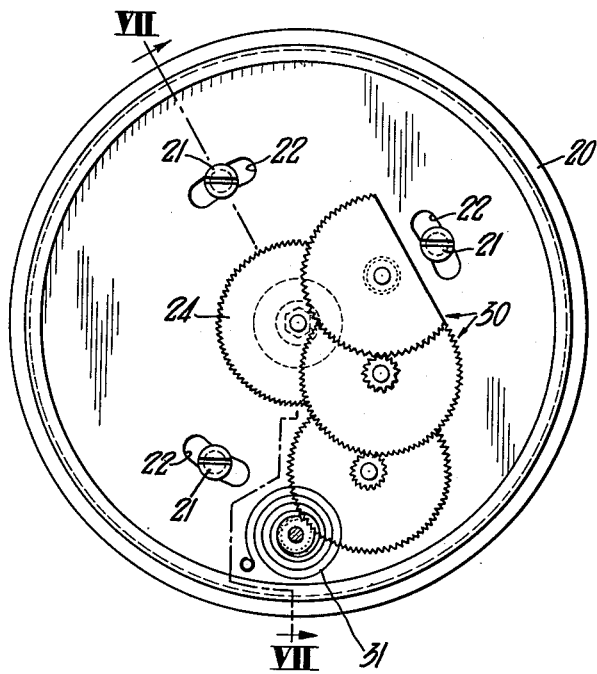
*Inventor:*
GERALD E. MOHNKERN,
by: Donald G. Dalton
*his Attorney.*

Patented June 1, 1954

2,679,755

UNITED STATES PATENT OFFICE 2,679,755

TORQUE INDICATOR

Gerald E. Mohnkern, Oil City, Pa., assignor to United States Steel Corporation, a corporation of New Jersey Application May 15, 1952, Serial No. 287,907

3 Claims. (Cl. 73—136)

This invention relates to a device for measuring and indicating relative torques in rotating shafts.

While the indicator is of general application and can be used on any rotatable shaft which has an exposed end, it has been developed particularly for indicating relative torques in crankshafts of oil well pumping units. Such units include fundamentally a power driven crankshaft, a walking beam, a pitman which connects the crankshaft and the walking beam, and counterbalance weights. The walking beam is connected to a rod string, which it raises and lowers on rotation of the crankshaft. When the unit is counterbalanced properly, the power requirements and the peak torque on the crankshaft are the same on both the upstroke and downstroke, although of course the torque is not uniform, but drops to a minimum during reversals of the rod string and builds up to a peak at the midpoints of each stroke. Measurement of the relative torques through a revolution of the crankshaft furnishes a convenient indication as to whether a pumping unit is counterbalanced properly.

An object of the present invention is to provide a torque indicator which is of simple construction and furnishes a continuous indication of relative torques in a rotating shaft.

A further object is to provide an improved torque indicator which has means for proportionately magnifying the angle through which a rotating shaft twists under any given loading condition and means for indicating this angle where it can be conveniently observed.

In accomplishing these and other objects of the invention, I have provided improved details of structure, a preferred form of which is shown in the accompanying drawings, in which:

Figure 6 is an elevational view of the indicator with the face plate removed; and Figure 7 is a sectional view taken on line VII—VII of Figure 6.

Figure 1:
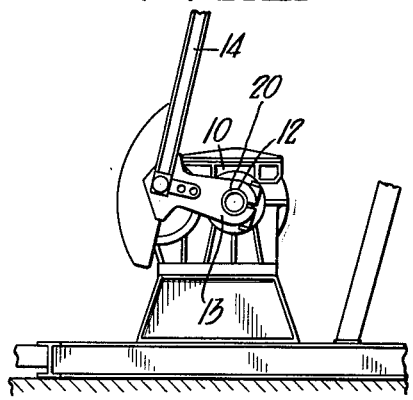
Figure 1 is a side elevational view of a portion of a pumping unit equipped with a torque indicator which embodies features of the present invention.
Figure 2:
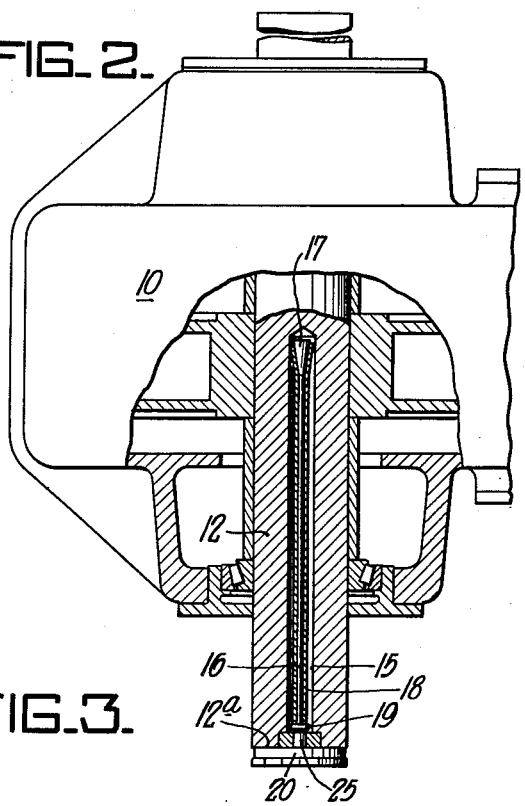
Figure 2 is a horizontal sectional view on a larger scale through the gear box and crankshaft of the pumping unit.

Figures 1 and 2 show a portion of a pumping unit which includes a gear box 10, a power driven crankshaft 12 rotatably mounted in said gear box, a crank 13 mounted on said crankshaft, and a pitman 14 connected to said crank. The unit is not shown in detail since it can be of any standard or desired construction, and further since it is only one example of a machine with which the indicator of the present invention can be used.

Figure 3:
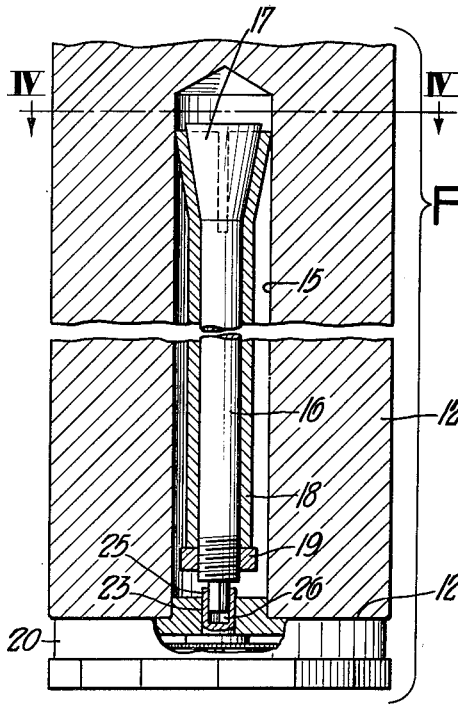
Figure 3 is a horizontal sectional view through the crankshaft on a still larger scale.
Figure 4:
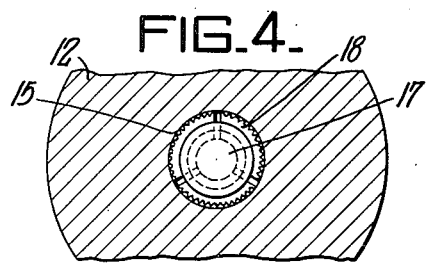
Figure 4 is a vertical sectional view taken on line IV—IV of Figure 3.

The crankshaft 12 has an exposed end 12a, into which is drilled an axial bore 15, preferably extending to about midway the length of the shaft (Figures 2 and 3). A rod 16 extends freely into said bore coaxially with the shaft and is rigidly anchored to the shaft at its inner end within the bore. The anchoring means illustrated includes a flared enlargement 17 on the inner end of the rod 16 and a tube 18 slipped over said rod. The inner end portion of the tube, which receives the enlargement 17, is split and externally knurled (Figure 4). Rod 16 has a screw-threaded section which is spaced inwardly from its outer end and carries a nut 19 (Figure 3). This nut bears against the outer end of tube 18 and, when tightened thereagainst, expands the split inner portion of said tube into tight engagement with the walls of shaft bore 15.

An indicator casing 20 is rigidly attached to the end 12a of the crankshaft. Preferably the attaching means includes machine screws 21 which are threadedly received in the end of the shaft and pass through arcuate slots 22 in the back of the casing (Figures 6 and 7). This arrangement enables the casing to be adjusted arcuately with respect to the shaft on loosening of screws 21. The back of the casing has a central bore 23. A gear 24 is housed within the casing 20 and has a hub 25 rotatably received in bore 23. Said hub has a noncircular counterbore 26 which nonrotatably receives the correspondingly shaped outer end of rod 16 (Figures 3 and 7).

Figure 5:
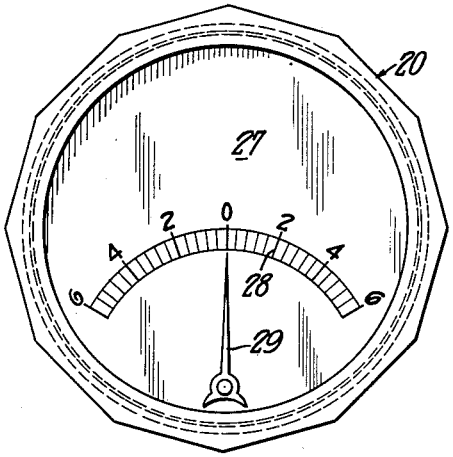
Figure 5 is an elevational view of the indicator face.

Casing 20 has an outer face plate 27 which bears a scale 28, preferably having its zero graduation at the center and graduated to indicate minutes of an arc in both directions therefrom (Figure 5). A pointer 29 is pivoted to the face plate 27 and is connected to the gear 24 via a magnifying train of gears 30 housed within the casing 20. A hairspring 31 surrounds the pointer shaft within the casing and tends to center the pointer with respect to scale 28 (Figures 6 and 7). The pointer can be centered exactly under no torque by arcuate adjustment of the casing 20 with respect to the shaft 12 and its rod 16.

In operation, the casing 20 is fixed with respect to the end of the shaft 12, while the rod 16 is fixed with respect to a point axially spaced therefrom, namely the point of anchorage within the bore 15. Torque loads applied to the shaft produce a relative twist between these two points. The gear 24 and gear train 30 transmit this relative twist to the pointer 29 and throw it off center one way or the other, depending on the direction of shaft rotation. If the scale 28 is graduated in minutes of an arc, the reading on the scale indicates the exact angle through which this section of the shaft twists under the load. In the example of a pumping unit crankshaft, this reading varies continuously, but reaches peak values at the mid-points of each stroke. In this example the speed of rotation is only about 12 R. P. M., which is slow enough that the indicator can be read by direct observation. If the indicator is used on high speed shafts, readings can be obtained with a stroboscope or photographically.

The angle of twist in the section of the shaft 12 between the point at which rod 16 is anchored and the end of the shaft furnishes a measure of the relative torque on the shaft. Where the only concern is to obtain uniform peak loads on the shaft, the absolute torque is immaterial, and a measure of the relative torque only suffices. However, the absolute torque load readily can be calculated from the relative torque.

While I have shown and described only a single embodiment of the invention, it is apparent that modifications may arise. Therefore, I do not wish to be limited to the disclosure set forth but only by the scope of the appended claims.

I claim:

1. The combination with a rotatable shaft which has an exposed end and an axial bore extending inwardly therefrom, of a torque indicator comprising a rod extending from said exposed end into said bore, a flared enlargement on the end of said rod within said bore, a tube receiving said rod and having a split and externally knurled end portion receiving said enlargement, a nut threadedly engaged with said rod and bearing against the other end of said tube and thereby expanding said split portion to anchor the end of said rod within said bore, a casing fixed to said exposed end but being arcuately adjustable thereon and bearing a graduated scale which has a zero graduation at a midpoint, a pointer pivoted to said casing and being movable relative to said scale, a hairspring connected to said pointer and normally moving it to the zero graduation of said scale, a gear fixed to the end of said rod, and a magnifying gear train operatively connecting said first named gear and said pointer, the relative displacement of said pointer thus being proportional to the angle of twist in the section of the shaft between said exposed end and the point of anchorage of said rod.

2. The combination with a rotatable shaft which has an exposed end and an axial bore extending inwardly therefrom, of a torque indicator comprising a rod extending from said exposed end into said bore, a flared enlargement on the end of said rod within said bore, a tube receiving said rod and having a split and externally knurled end portion receiving said enlargement, a nut threadedly engaged with said rod and bearing against the other end of said tube and thereby expanding said split portion to anchor the end of said rod within said bore, a casing fixed to said exposed end but being arcuately adjustable thereon and bearing a graduated scale which has a zero graduation at a midpoint, a pointer pivoted to said casing and being movable relative to said scale, spring means normally moving said pointer to said zero graduation, and gears operatively connecting said rod and said pointer, the relative displacement of said pointer thus being proportional to the angle of twist in the section of the shaft between said exposed end and the point of anchorage of said rod.

3. The combination with a rotatable shaft which has an exposed end and an axial bore extending inwardly therefrom, of a torque indicator comprising a rod extending from said exposed end into said bore, radially expandable anchoring means fixing one end portion of said rod within said bore, a casing fixed to said exposed end but being arcuately adjustable thereon and bearing a graduated scale which has a zero graduation at a midpoint, a pointer pivoted to said casing and being movable relative to said scale, a hairspring connected to said pointer and normally moving it to the zero graduation of said scale, a gear fixed to the end of said rod, and a magnifying gear train operatively connecting said first named gear and said pointer, the relative displacement of said pointer thus being proportional to the angle of twist in the section of the shaft between said exposed end and said anchoring means.

References Cited in the file of this patent

UNITED STATES PATENTS

| Number | Name | Date |
|---|---|---|
| 1,227,043 | Cummings | May 22, 1917 |
| 2,219,632 | Naden | Oct. 29, 1940 |
| 2,329,121 | Lamberger et al. | Sept. 7, 1943 |
| 2,367,224 | Larson et al. | Jan. 16, 1945 |
| 2,519,378 | Kilpatrick | Aug. 22, 1950 |